June 11, 1968     P. SAMMARCO ET AL     3,387,691
CLUTCH CONTROL MECHANISM FOR ALTERNATE RELEASE AND ENGAGEMENT
Filed Oct. 27, 1966     4 Sheets-Sheet 1
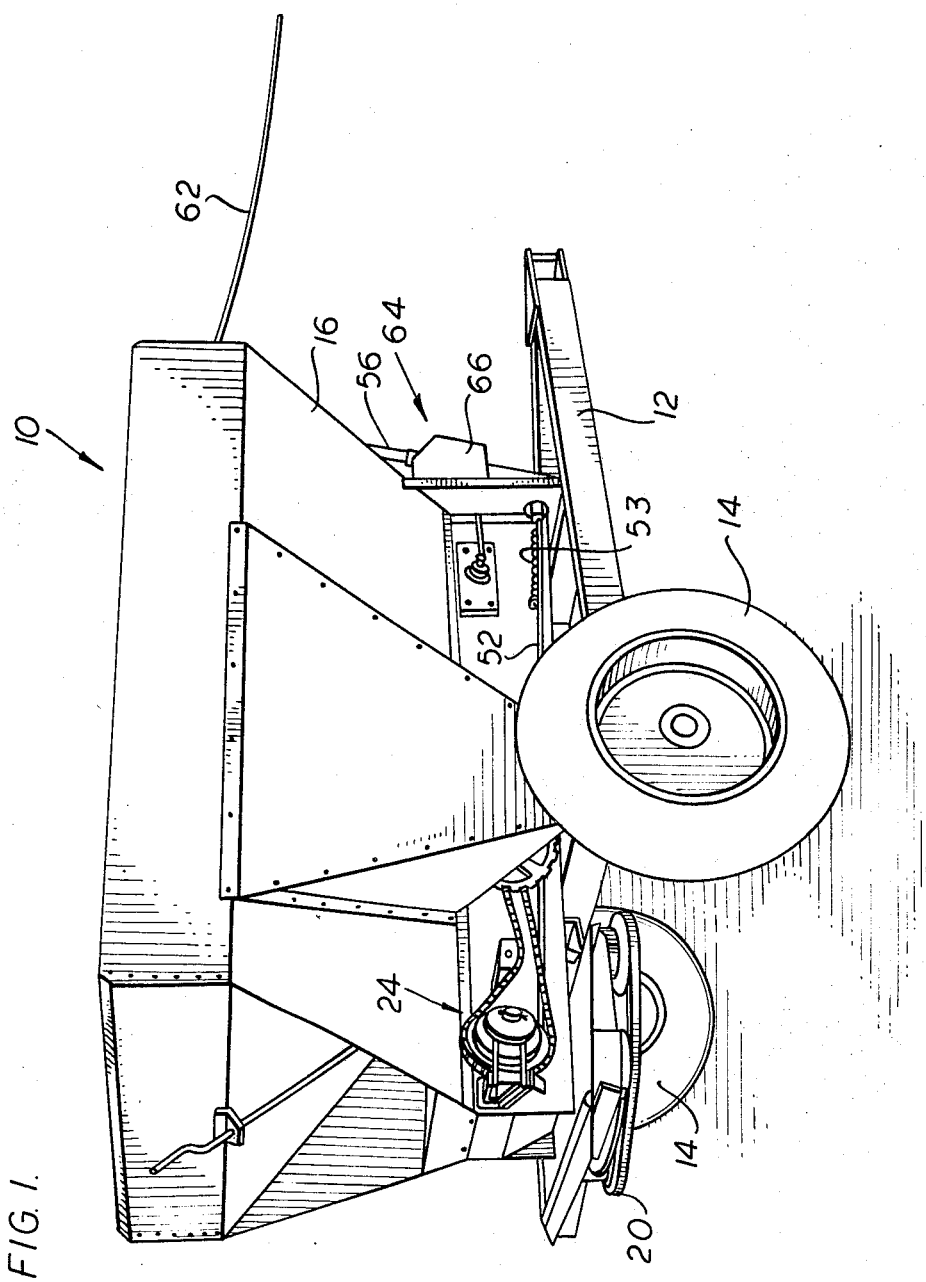
INVENTORS
PETER SAMMARCO
ARNOLD ZIMMERMAN
ATTY June 11, 1968     P. SAMMARCO ETAL     3,387,691
CLUTCH CONTROL MECHANISM FOR ALTERNATE RELEASE AND ENGAGEMENT Filed Oct. 27, 1966     4 Sheets-Sheet 2

INVENTORS
PETER SAMMARCO
ARNOLD ZIMMERMAN

ATTY

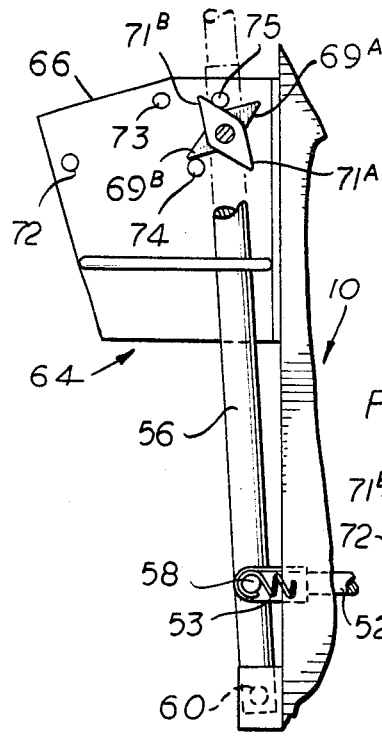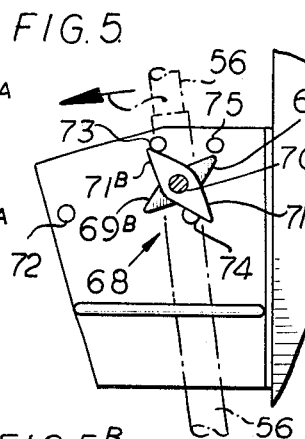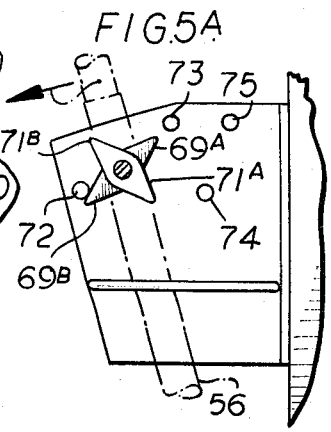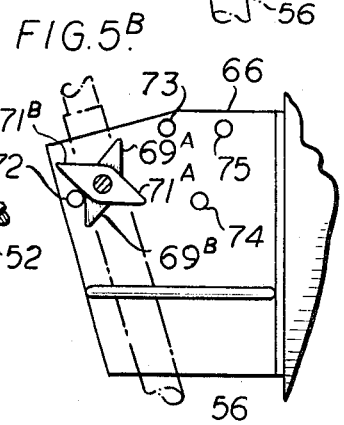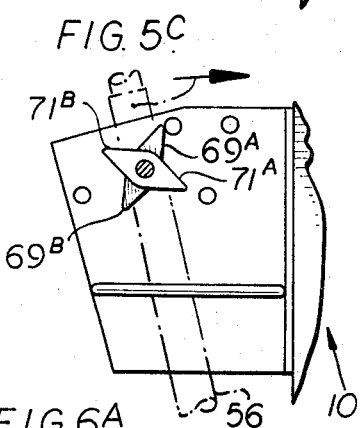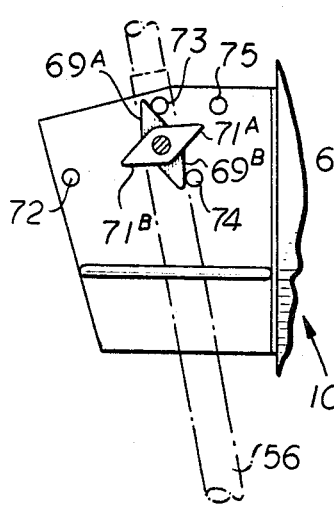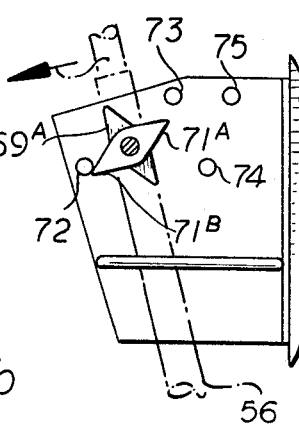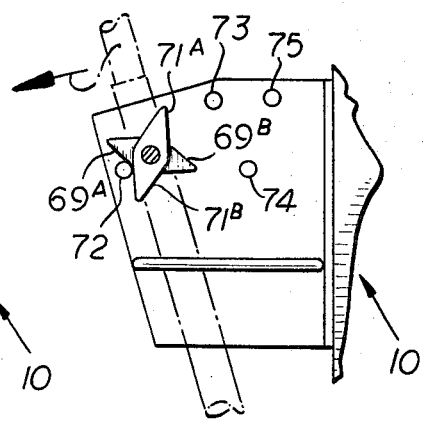

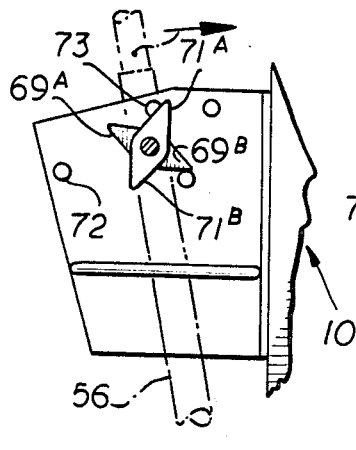
FIG.6.B
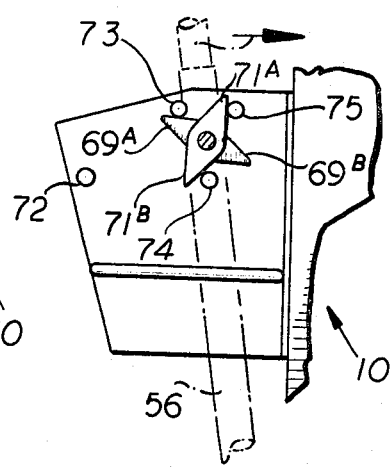
FIG.6.C
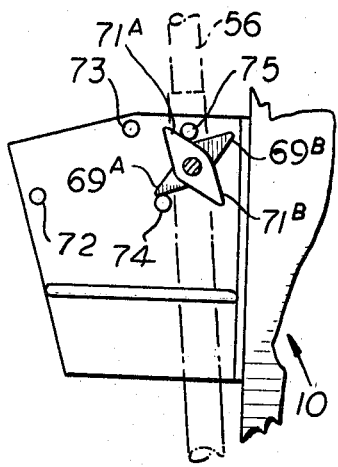
FIG.6.D
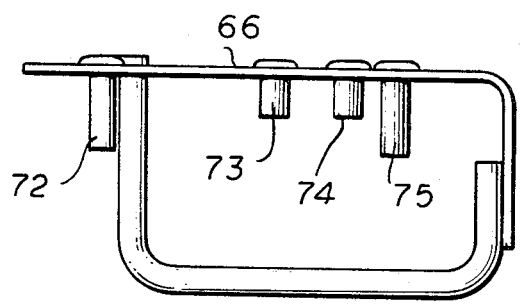
FIG.7.
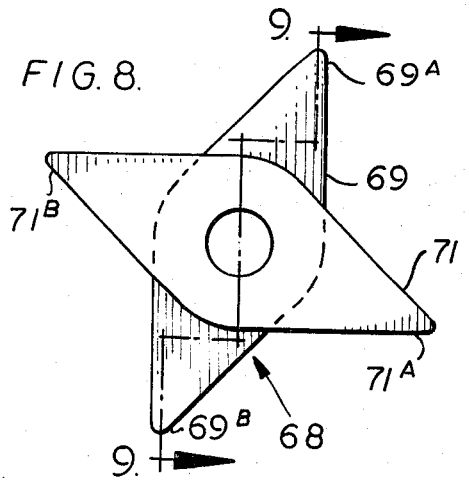
FIG.8.
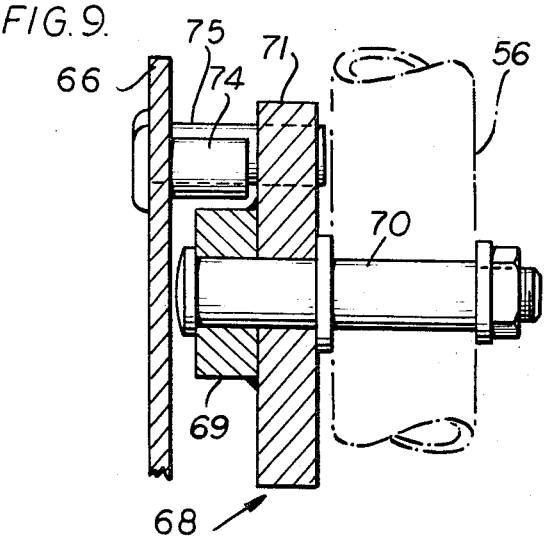
FIG.9.
INVENTORS
PETER SAMMARCO
ARNOLD ZIMMERMAN
ATTY

United States Patent Office 3,387,691
Patented June 11, 1968

3,387,691
CLUTCH CONTROL MECHANISM FOR ALTERNATE RELEASE AND ENGAGEMENT
Peter Sammarco, Bellwood, and Arnold Zimmerman, Downers Grove, Ill., assignors to International Harvester Company, Chicago, Ill., a corporation of Delaware
Filed Oct. 27, 1966, Ser. No. 590,034
11 Claims. (Cl. 192—92)

ABSTRACT OF THE DISCLOSURE

A clutch operator mounted on a towed implement consisting of a pivoted lever on which is rotatably fixed a star wheel; wherein, the star wheel, interacting with stop means, causes alternate engagement and release of a jaw clutch upon successive movement of the lever in the same direction.

---

This invention relates to a control mechanism and particularly to such a mechanism for controlling the engaging and disengaging of a spring-loaded clutch at a location remote therefrom.

In fertilizer spreader devices, for example, an apron conveyor is disposed at the bottom of a material-carrying body portion of a towed implement, and moves the material to the rear of the implement to deposit it on a spinner mechanism. To achieve a uniform distribution of the material on the ground, the speed of the conveyor must be related to the ground speed of the implement, i.e., as the implement speed increases the conveyor speed must also increase in order to supply more material to the spinner and as ground speed decreases the conveyor must slow down at a corresponding rate. A drive means from one of the ground-engaging wheels of the towed implement is ideally suited to provide the desired speed characteristics. However, during transport to the field, and on other occasions, it is necessary for the conveyor to be immobilized while the implement is being towed. Hence, a clutch mechanism is interposed in the drive train from the wheel to the conveyor. Since the implement is towed by a tractor, it is also desirable to provide a means for remotely actuating the clutch mechanism from the tractor seat so that it is not necessary for the operator to dismount. Further, it is desirable that such means be of the type in which successive pull on a lanyard or trip rope will alternately effect clutch engagement and disengagement, and will maintain the clutch in its newly acquired attitude between successive pulls.

It is accordingly an object of the present invention to provide a control mechanism for actuating a clutch which is operable from the application of a tension force only.

It is also an object of the present invention to provide a control mechanism which will change the attitude of a clutch upon the application of a force and maintain such changed attitude until the application of an identical force.

Another object of the present invention is to provide a clutch control mechanism which can be operated by a straight line motion.

A further object is to provide a clutch control mechanism which is simple and inexpensive to manufacture, and which requires minimal maintenance.

These and other objects and many of the attendant advantages of this invention will become more readily apparent upon perusal of the following description and the accompanying drawings, wherein:

FIGURE 1 is a perspective view of a material-carrying unit embodying the present invention;

FIGURE 4 is a side elevational view of that portion of the clutch control mechanism shown in FIGURE 3, and illustrating the sequencing unit in a clutch-engaged position;

FIGURES 5 through 5D are side elevational views of the sequencing mechanism as it is being moved from a clutch-engaged position to a clutch-disengaged position;

FIGURES 6 through 6D are side elevational views of the sequencing mechanism as it is being moved from the clutch-disengaging position to a clutch engaged position;

FIGURE 7 is a top plan view of the plate portion of the sequencing unit;

FIGURE 8 is a side elevational view of the star wheel utilized in the sequencing unit; and FIGURE 9 is a cross-sectional view taken on line 9—9 of FIGURE 8.

Figure 3:
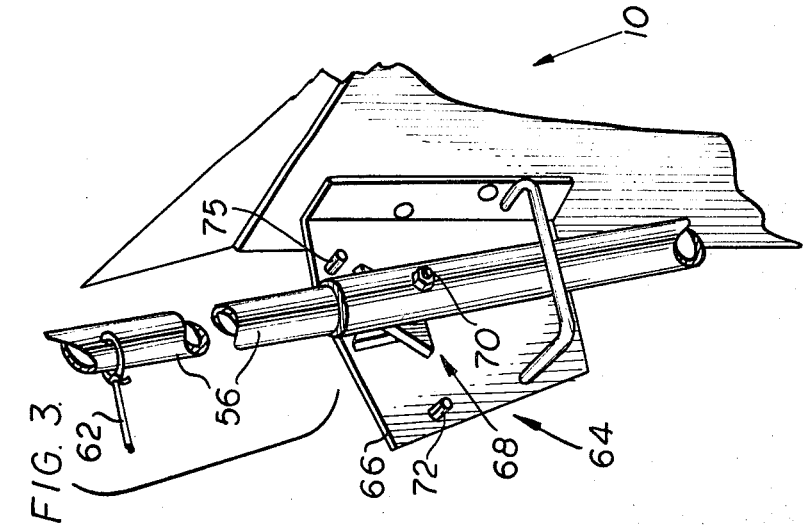
FIGURE 3 is a perspective view of a portion of the clutch control mechanism.
Figure 2:
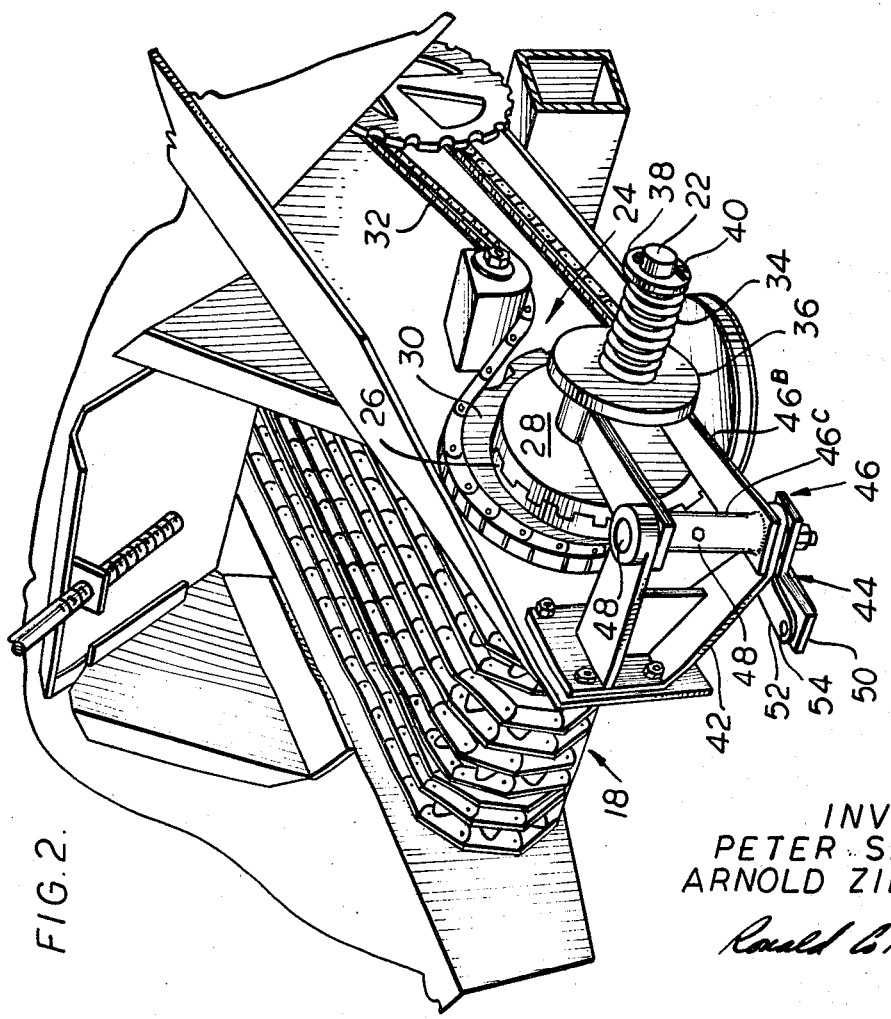
FIGURE 2 is a perspective view of the rear portion of the implement shown in FIGURE 1.

Referring now to the drawings, there is shown in FIGURE 1 a material spreader implement, indicated generally at 10, having a frame 12, which is carried by a pair of laterally spaced, ground-engaging wheels 14. A hopper body 16 is supported on the frame 12 and at the narrow bottom thereof is provided with a conveyor 18, which is operable to transport material within the hopper toward the distributing unit 20 at the rear of spreader 10. The conveyor 18 is propelled by a shaft 22 rotatably mounted on the spreader 10 through a jaw clutch 24, which comprises a drive member 26 and a driven member 28. The drive member 26 is freely rotatable on the shaft 22 but is restrained against axial movement, while the driven member 28 is non-rotatably secured to the shaft 22 but is movable axially thereof. Both members are provided with complementary engageable teeth, which drivingly connect the two members for rotation of the shaft 22. A sprocket 30 is secured to the drive member 26 and accepts a chain 32, which chain is transported by suitable, conventional gears, not full shown, from one of the ground-engaging wheels 14. The teeth of the members 26 and 28 are urged into engagement by a compression spring 34 which is trapped on the shaft 22 between a collar 36 formed integrally with the member 28 and a washer 38, which is retained on the shaft 22 by a pin 40. A bifurcated bracket 42, which is provided with a pair of aligned holes, is secured to the spreader 10 and supports a bellcrank 44. The upper crank arm 46 of the bellcrank 44 is split into upper and lower arms 46A and 46B, each of which are secured to a hollow center section 46C, and define a shifting fork; the free ends of the arms 46A and 46B being disposed between the driven clutch member 28 and the collar 36. A pin 48 passes through the hollow section 46C and the aligned holes in the bracket 42 and is secured to the upper crank arm 46 by a set screw 48. The lower crank arm 50 is secured to the pin 48 and is pivotally secured at its free end to a connecting rod 52 by means of pin 54. It will be apparent that the application of a tension force to the connecting rod 52 will result in rotation of the bellcrank 44 about the axis of the pin 48 thereby causing the driven clutch member 28 to be moved away from the drive member 26 against the bias of the spring 34.

The connecting rod 52 extends forward from the crank arm 50 and is connected by means of pivot pin 58 to a lever 56, which lever is pivotally attached to the spreader 10 by means of a pivot pin 60, as shown in FIGURE 4. A tension spring 53 is also secured between the pin 58 and the implement 10 and urges the lever toward the implement. A trip rope or lanyard 62, as seen in FIGURES 1 and 3, is attached to the free end of the lever 56 and extends forward toward the towing vehicle where it is secured in a position for easy grasping by the operator thereof. A clutch control and sequencing mechanism, indicated generally at 64, comprises a backing plate 66 which is secured by suitable means to the spreader 10 in a plane parallel to the plane in which the lever 56 pivots. A star wheel 68 is rotatably mounted on the lever 60 in close proximity to the backing plate 66. The star wheel 68, as shown in the preferred embodiment consists of a pair of arms, each of which have tapered ends secured, with their major axis perpendicular to each other, in face-to-face engagement and pivotally mounted on the pin 70 at their geometric centers. Four rotation inducing pins 72, 73, 74 and 75 are secured to the backing plate 66 and positioned in the path of movement traced by the star wheel as the lever 60 pivots about the pin 60. The two outer pins 72 and 75 are longer than the intermediate pins 73 and 74. Since the two arms comprising the star wheel are secured in face-to-face engagement that arm which is adjacent to the lever 60, i.e., the inner arm 71, will not come in contact with the intermediate pin 73 and 74, but will only contact outer pins 72 and 75, while the arm which is farther from the lever 60, i.e., the outer arm 69, will contact all of the pins. The pins 73 and 75 are positioned above the arc traced by the center of the pivot pin 70 while the pin 74 is positioned below this arc and the pin 72 is positioned substantially on the arc. The spacing between the pins 74 and 73 and between 74 and 75 is less than the length of the arms comprising the star wheel 68, but is greater than the width of these arms at their maximum transverse extent.

The cooperation of the star wheel 68 with the pins 72, 73, 74 and 75 in a manner to control the jaw clutch 24 will be described by reference to the sequence of operation. Starting with the control unit 64 in the clutch-engaged position, as shown in FIGURE 4, where it is urged by the combined action of the compression spring 34 and the tension spring 53, the trip rope 62 is pulled by the operator of the towing vehicle. The lever 56 is thereby caused to pivot about the pin 60 and moves the star wheel through the various positions shown in FIGURES 5, 5A and 5B. The star wheel 68 is mounted on the lever 56 with frictional engagement therebetween sufficient to prevent rotation of the star wheel 68 on the pin 70 except when contact with one of the pins 72, 73, 74 and 75 forces rotation. As the lever 56 moves to the position shown in FIGURE 5 both of the pawls 71B and 71A, which pawls constitute opposite ends of the arm 71, pass by the shorter pins 73 and 74 without inducing rotation in the star wheel 68 since the arm 71 is positioned adjacent the lever 56 and will not come in contact with the pins 73 and 74 and the arm 69 which is capable of contact with the pin 73 and 74 is oriented substantially transverse to a line connecting the shorter pins and will pass therebetween without contacting either of them. As shown in FIGURE 5, upon further movement of lever 56, the pawl 69B will contact the longer pin 72, and due to the tapered shape of the pawl will cause star wheel 68 to rotate counterclockwise until the pin 72 is located between the two pawls 71B and 69B. At this point the lever 56 is at the extreme forward limit and cannot be urged to pivot beyond the pin 72. As the operator then releases the trip rope 62, the springs 34 and 53 urge the lever to pivot in the direction shown in the arrow in FIGURE 5C. The previous contact of the star wheel with the pin 72 has now oriented the star wheel so that pawl 69A will contact the pin 73, and as the springs urge the lever 56 in the direction of the arrow shown in FIGURE 5C the star wheel will be caused to pivot in a counterclockwise direction until the pawl 69B comes in contact with the pin 74. In this orientation, as shown in FIGURE 5D, the star wheel 68 is trapped by the shorter pin 74 and 73 and retains the lever 56 in this position, wherein the clutch is held in its disengaged attitude.

With the clutch control mechanism 64 retaining the clutch in its disengaged position, the next pull on the trip rope or lanyard 62 will result in engagement of the clutch. The sequence of movements occurring within the clutch control mechanism 64 is illustrated in FIGURES 6, 6A, 6B, 6C, and 6D. With the lever 56 and the star wheel 68 in its position for maintaining the clutch disengaged, as illustrated in FIGURE 5D, pulling on the lanyard 62 will pivot the lever 56 in the direction of the arrow shown in FIGURE 6. As the lever 56 is pivoted the upper surface of the tapered arm 71B contacts the pin 72 and further pivoting of the lever 56 causes the pin 72 to rotate the entire star wheel 68 in a counterclockwise direction until the wheel and lever is positioned as shown in FIGURE 6A. Since the pin 72 is located on the arc traced by the center of the pin 70 as it pivots about the pin 60, the lever 56 is blocked from further movement to the left as viewed in FIGURE 6A. When the operator, who is pulling on the lanyard 62, feels the resistance to further movement of the lever 56, the lanyard 62 is released and the springs 34 and 53 initiate return of the lever 56 to the clutch-engaged position. As shown in FIGURE 6B the amount of rotation of the star wheel 68 which was provided by the pin 72 has oriented the outer arm 69 so that it will pass by the pin 74, which permits the entire star wheel 68 to cross a line joining the two shorter pins 73 and 74. However, the contact of the star wheel with pin 72 has oriented the star wheel so that the inner arm 71A will contact the pin 75, as shown in FIGURE 6C. Further movement of the lever 56 to the right as viewed in FIGURE 6C, under the influence of the springs 34 and 53 causes the star wheel 68 to rotate in a counterclockwise direction until the outer arm 69A contacts the pin 74. When this condition has been achieved, as shown in 6D, no further movement of the lever 56 toward the right, as viewed in these figures is possible. The lever 56 will be retained in the position shown in FIGURE 6D by the action of the spring 53 which will permit the clutch 24 to remain engaged until the lanyard is again pulled. On each successive pull of the lanyard, the star wheel will be oriented to permit the star wheel to alternately pass and be retained by the shorter pins 73 and 74.

It will be appreciated from the foregoing description that the present invention provides a clutch control mechanism which is simple and inexpensive to manufacture, which requires very little maintenance, and which achieves the requisite control for a clutch through the simple expedient of pulling on a trip rope.

While a preferred embodiment of the present invention has been shown and described herein, it is to be understood various modifications and variations may be made without departing from the spirit of the invention as defined by the scope of the appended claims.

What is claimed is:

1. A mechanism for controlling a spring-loaded clutch on a towed implement, comprising;
   a lever adapted to be pivotally mounted on said implement and operatively connected to said clutch,
   a star wheel rotatably mounted on said lever,
   plate means adapted to be mounted on said implement adjacent to said lever,
   stop means carried by said plate means and engageable with said star wheel,
   rotation inducing and positioning means carried by said plate means,
   said wheel and said stop means being arranged such that said wheel engages said stop means to retain the clutch in its disengaged position when said wheel is oriented in a first position and passes by said stop means to permit engagement of said clutch when said wheel is oriented in a second position,
   and said rotation means alternately rotates said wheel to said first and second positions in response to successive pivoting of said lever.

2. A mechanism according to claim 1 wherein said star wheel comprises;
   a pair of arms having longitudinal axes, said arms being non-rotatably secured relative to each other with said axes substantially perpendicular, said arms being offset relative to each other along the rotational axis of said star wheel, so that one of said arms is closer to said plate means than the other, and each of said arms being tapered at both ends.

3. A mechanism according to claim 2 wherein said stop means and said rotation inducing means comprises; first, second, third and fourth pins affixed to said plate means and projecting laterally therefrom, said first pins being positioned substantially on the arc traced by the rotational axis of said star wheel during pivoting of said lever, said second and fourth pins being positioned above said arc, said third pin being positioned below said arc, said second and third pins being located intermediate said first and fourth pins, and being spaced apart a distance less than the length but greater than the maximum width of said one arm, and said second and third pin means being shorter than said first and fourth pin means so that said second and third pins are capable of engagement only with said one arm and said first and fourth pins are capable of engagement with either arm.

4. A mechanism according to claim 3 and further comprising;

bias means connected between said lever and the implement for urging said lever toward a clutch engaged position, and a trip rope affixed to said lever for remotely pivoting the lever against the force of said bias means.

5. A mechanism for controlling an implement-mounted clutch movable between engaged and disengaged positions comprising;

plate means capable of being secured to the implement, a star wheel operatively connected to the clutch and mounted for rotation about an axis which axis is movable in a path parallel to said plate means, stop means carried by said plate means and engageable with said star wheel, rotation inducing and positioning means carried by said plate means, said wheel and said stop means being arranged such that said wheel engages the stop means to retain the clutch in its disengaged position when said wheel is oriented on a first position and said wheel passes by said stop means to permit engagement of the clutch when said wheel is oriented in a second position, and said rotation means alternately rotates said wheel to said first and second positions in response to successive movements of said wheel along said path.

6. A mechanism according to claim 5 and further comprising;

a lever adapted to be pivotally mounted on the implement and operatively connected to the clutch, said star wheel being rotatably carried by said lever whereby pivotal movement of said lever defines said path.

7. A mechanism according to claim 6 wherein said star wheel comprises;

a pair of arms having tapered ends, said arms being non-rotatably secured relative to, and positioned transverse of each other, and said arms being offset along said rotational axis so that one of said arms is closer to said plate means than the other.

8. A mechanism according to claim 7 wherein said stop means and said rotation inducing means comprises, extreme pin means affixed to said plate means, intermediate pin means affixed to said plate means and positioned between said extreme pin means, said extreme pin means being longer than said intermediate pin means so that only said one arm is capable of contacting said intermediate pin means, when said wheel is in said first position.

9. A mechanism according to claim 8 wherein said extreme pin means comprises a pair of longer pins with one longer pin located substantially on said path and the other longer pin above said path, and said intermediate pin means comprises a pair of shorter pins with one shorter pin located above and the other shorter pin located below said path, said intermediate pins and the said other longer and said other shorter pins being spaced apart a distance less than the length of said arms but greater than the maximum width of said arms.

10. A mechanism according to claim 9 and further comprising;

bias means connected between the implement and the lever to urge the latter toward a clutch engaged position, and a trip rope secured to said lever for pivoting the latter toward said one longer pin, whereby said mechanism may be operated remotely.

11. A mechanism for controlling a spring loaded clutch on a towed implement, comprising;

a lever adapted to be pivotally mounted on said implement and operatively connected to said clutch, a star wheel rotatably mounted on one said lever and said implement, plate means adapted to be mounted on the other of said lever and said implement adjacent to said lever, stop means carried by said plate means and engageable with said star wheel, rotation inducing and positioning means carried by said plate means, said wheel and said stop means being arranged such that said wheel engages said stop means to retain said lever in a clutch disengaged position when said wheel is oriented in a first position and passes by said stop means to permit said lever to move to a clutch engaged position when said wheel is oriented in a second position, and said rotation means alternately rotates said wheel to said first and second positions in response to successive pivoting of said lever.

References Cited

UNITED STATES PATENTS

| 1,711,338 | 4/1929 | Anderson et al. | 192—92 |
| 2,378,330 | 6/1945 | Schill et al. | 192—92 |
| 2,658,396 | 11/1953 | Christiance. | |
| 3,252,555 | 5/1966 | Polzin | 192—92 |

FOREIGN PATENTS 168,698   3/1906   Germany.

MARTIN P. SCHWADRON, *Primary Examiner.*

C. M. LEEDOM, *Assistant Examiner.*